(12) United States Patent
Picken et al.

(10) Patent No.: US 11,794,979 B2
(45) Date of Patent: Oct. 24, 2023

(54) PAW-SHAPED ODOR CONTROL ITEM AND ASSOCIATED PACKAGING AND METHODS

(71) Applicant: Beaumont Products, Inc., Kennesaw, GA (US)

(72) Inventors: Jeffrey M. Picken, Kennesaw, GA (US); Joseph P. Perushek, Baraboo, WI (US); Scott A. Behner, Contoocook, NH (US)

(73) Assignee: BEAUMONT PRODUCTS, INC., Kennesaw, GA (US)

( * ) Notice: Subject to any disclaimer, the term of this patent is extended or adjusted under 35 U.S.C. 154(b) by 264 days.

(21) Appl. No.: 17/389,435

(22) Filed: Jul. 30, 2021

(65) Prior Publication Data

US 2022/0095579 A1    Mar. 31, 2022

Related U.S. Application Data

(60) Provisional application No. 63/084,633, filed on Sep. 29, 2020.

(51) Int. Cl.
*B65D 75/32* (2006.01)
*B65D 75/36* (2006.01)
*B29C 39/02* (2006.01)
*B29C 39/26* (2006.01)

(52) U.S. Cl.
CPC ............ *B65D 75/325* (2013.01); *B29C 39/02* (2013.01); *B29C 39/26* (2013.01); *B65D 75/367* (2013.01); *B65D 2575/368* (2013.01)

(58) Field of Classification Search
CPC ............... B65D 75/325; B65D 75/367; B65D 2575/368; B29C 39/02; B29C 39/26

USPC ............ 206/528, 538; 34/289; 53/440, 467; 264/31

See application file for complete search history.

(56) References Cited

U.S. PATENT DOCUMENTS

| | | | |
|---|---|---|---|
| 5,312,240 A * | 5/1994 | Divone, Sr. ......... | B29C 67/0044 264/296 |
| 7,426,799 B2 * | 9/2008 | Christianson ....... | A01M 1/2055 40/406 |
| D581,830 S * | 12/2008 | Slabaugh ..................... | D11/127 |
| D591,162 S * | 4/2009 | Slabaugh ...................... | D9/414 |
| 9,907,291 B2 | 3/2018 | Lathim | |
| 2002/0112449 A1 * | 8/2002 | Heath ..................... | B65B 47/04 53/471 |
| 2004/0163604 A1 | 8/2004 | Kirk et al. | |

(Continued)

FOREIGN PATENT DOCUMENTS

| | | |
|---|---|---|
| WO | 2006041836 A1 | 4/2006 |
| WO | 2006086410 A1 | 8/2006 |
| WO | 2011155967 A1 | 12/2011 |

*Primary Examiner* — Jacob K Ackun
(74) *Attorney, Agent, or Firm* — Perilla Knox & Hildebrandt LLP; Kenneth A. Knox (57) ABSTRACT

Disclosed are various embodiments for forming an odor control item and providing packaging for an odor control item. A method for forming at least one odor control item includes providing a resealable package comprising a first blister and a second blister, wherein the first blister comprises at least one cavity, performing a hot mold process whereby a liquid substance is poured into the at least one cavity, and curing the liquid substance while the liquid substance is in the at least one cavity to form the at least one odor control item.

16 Claims, 9 Drawing Sheets

(56) References Cited

U.S. PATENT DOCUMENTS

| | | | |
|---|---|---|---|
| 2008/0190789 A1* | 8/2008 | D'Amico | B60H 3/0014 |
| | | | 422/123 |
| 2009/0159486 A1* | 6/2009 | Senter | B65D 75/367 |
| | | | 206/229 |
| 2010/0136128 A1* | 6/2010 | Hurwitz | A01K 1/0155 |
| | | | 424/76.9 |
| 2010/0176213 A1* | 7/2010 | Belongia | A01M 1/2077 |
| | | | 239/56 |
| 2011/0185977 A1 | 8/2011 | Dixon et al. | |
| 2011/0185978 A1 | 8/2011 | Dixon et al. | |
| 2014/0048618 A1* | 2/2014 | Kunesh | A47G 1/141 |
| | | | 239/57 |
| 2014/0314619 A1* | 10/2014 | Davanzo | A61L 2/18 |
| | | | 422/4 |
| 2021/0392852 A1* | 12/2021 | Gabel | A01K 1/04 |

* cited by examiner

PAW-SHAPED ODOR CONTROL ITEM AND ASSOCIATED PACKAGING AND METHODS

CROSS-REFERENCE TO RELATED APPLICATION

This application claims the benefit of and priority to U.S. Provisional Patent Application No. 63/084,633 entitled "PAW-SHAPED ODOR CONTROL ITEM AND ASSOCIATED PACKAGING AND METHODS," filed Sep. 29, 2020, the contents of which being incorporated by reference in their entirety herein.

BACKGROUND

Pets, such as cats, urinate and defecate in household enclosures, such as litter boxes and the like. These household enclosures provide and contribute to undesirable odors in a household. In order to control the orders, litter boxes must be cleaned regularly via scooping or similar cleaning method. Some litter boxes include a sifting pan that requires an operator to sift debris from the litter box while permitting litter to be returned to the litter box.

US Patent Publication No. 2004/0163604 A1 to Kirk et al. describes a cat litter box of a passthrough type that includes a tray on which the litter is deposited. The tray has openings in the base for passage of liquid wastes into a sump for the collection of liquid waste separate from the litter, which provides means for releasing the collected liquid and reducing the release of odors from the collected liquids and residues which cling to the litter.

WO Patent Publication No. 2006/041836 A1 to Botvinick et al. describes odor abatement and sterilizing air that is in and around a household enclosure, such as a pet litter box enclosure, as well as abating odor and air-born bacteria that emanate from within the enclosure. Air from a household enclosure is passed through a filtration device in air flow communication with the household enclosure. Air is typically passed through more than one time, and preferably many times (i.e., multi-pass filtration). A device draws air from an enclosure through an inlet, processes the air within the device, and returns the processed air back into the enclosure or out into the surrounding environment.

WO 2006/086410 A2 to Narasimhan et al. describes a breakable odor control additive that releases fragrance or odor masking scent when present in a litter formulation that is used by a cat or another animal within a litter box. The odor control additive comprises a plurality of fragrant-scented balls. Each of the balls has a central, compressible, porous, open-celled substrate, which is saturated with a fragrant scent. This central, fragrance-saturated substrate is coated with a barrier coating, which prevents evaporation of the fragrance and protects the substrate against deterioration by urine and other contaminants deposited on the litter. When a cat or another animal enters the litter box, a load is applied to the fragrant-scented balls. The barrier coating breaks, exposing the fragrant coated substrate. Fragrance evaporating from the substrate provides odor control and a pleasant scent.

FIELD OF THE INVENTION

The present disclosure relates to the field of control and management of pet-related odors. Specifically, the present disclosure relates to control, management, and reduction of odors from household enclosures utilized by pets, such as pet litter boxes.

BRIEF SUMMARY

A method for forming at least one odor control item is described that includes providing a resealable package comprising a first blister and a second blister, where the first blister comprises at least one cavity. The method further includes performing a hot mold process whereby a liquid substance is poured into the at least one cavity, and curing the liquid substance while the liquid substance is in the at least one cavity to form the at least one odor control item. The at least one odor control item as formed may include a paw-shaped odor control item having digital pad projections and a metacarpal pad projection.

In some embodiments, the at least one odor control item is one of a plurality of odor control items cured in the resealable package. The resealable package may be a clamshell package in some embodiments, where the at least one cavity is a plurality of cavities. A back blister of the clamshell package may include a plurality of low-raised bosses that match an opening of respective ones of the plurality of cavities.

Side-walls of respective ones of the low-raised bosses and the cavities may combine to form a resealable seal that prevents the odor control items from escaping during curing and protects a scent of the plurality of odor control items from evaporation until removed from the clamshell package. The at least one odor control item may be a litter box odor control item, and the method may further include positioning the at least one odor control item in a litter box.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to methods for forming a paw-shaped odor control item, packaging for a paw-shaped odor control item, and storing a paw-shaped odor control item. According to various embodiments, a paw-shaped odor control item is provided that includes a body having a top surface and a bottom surface. The paw-shaped odor control item includes digital pad projections and a metacarpal pad projection. By virtue of the shape of the body, which includes the digital pad projections and the metacarpal pad projection, the odor control item may be referred to as paw-shaped as it resembles a paw of a cat or another animal.

While the embodiments described herein relate to forming a paw-shaped odor control item, the appearance of the paw-shaped odor control item is purely aesthetic and is not intended to be claimed as the invention. Rather, the embodiments described herein relate to forming the paw-shaped odor control item, thereby rendering a paw-shaped odor control item has a certain aesthetic appearance. As such, the appearance of the paw-shaped odor control item and the shape of the body of the paw-shaped odor control item are not functional.

The digital pad projections and the metacarpal pad projection project from the top surface of the body of the paw-shaped odor control item. In some embodiments, the digital pad projections and the metacarpal pad projection are spaced apart without touching one another. The body of the paw-shaped odor control item includes a top arched portion projecting upwards from a central region of the body. As such, a first side of the body extends radially in a first direction and a second side of the body extends radially in a second, opposite direction such that a bottom end of the body has a width less than a top end of the body. Further, the bottom end of the body includes an inward arched portion that forms a portion of the metacarpal pad projection.

Each of the projections, such as the digital pad projections and the metacarpal pad projection, may include arched stepped regions that extend from the top surface of the body to a respective one of the projections. The bottom surface of the paw-shaped odor control item may be substantially flat without contour.

In various embodiments, the paw-shaped odor control item is formed through a hot mold process where a liquid substance is poured into a mold, such as a plastic mold, and then cured to become solid. Further, in some embodiments, the paw-shaped odor control item is formed through a hot mold process where a liquid substance is poured into a paw-shaped cavity of a tray, as will be described in greater detail below. When cured, the paw-shaped odor control item may weigh between five and ten ounces, for example, or have another suitable weight. For instance, in some embodiments, the paw-shaped odor control item may weigh approximately six ounces (e.g., ±two ounces).

The cured paw-shaped odor control item may be formed of and may comprise water, sodium stearate, glyceryl stearate, propylene glycol, fragrance, propanediol, polysorbate 20, silica, decyl glucoside, and sodium chloride, or any combination thereof. In addition to or in place of some of the foregoing, in some embodiments, the cured paw-shaped odor control item is formed of and comprises glycerin, sodium chloride, and sodium bicarbonate. As may be appreciated, reasonable substitutes to the foregoing may be employed. Accordingly, when placed in a litter box or other desired area, the paw-shaped odor control item may act as a deodorizer and emit pleasant odors in place of or to mask unpleasant and non-desirable odors.

According to various embodiments of the present disclosure, a paw-shaped odor control item may be formed by providing a resealable package comprising a first blister and a second blister, where the first blister comprises at least one paw-shaped cavity. The precise shape of the paw-shaped cavity is aesthetic and may be rendered in other shapes than those depicted and described herein. As such the shape of the paw-shaped cavity is not functional. A hot mold process may be performed whereby a liquid substance is poured directly into the at least one paw-shaped cavity, for instance, without use of an intermediary mold. The liquid substance is cured while in the at least one paw-shaped cavity to form at least one paw-shaped odor control item. The paw-shaped odor control item as formed may include a plurality of digital pad projections and a metacarpal pad projection.

Figure 1:
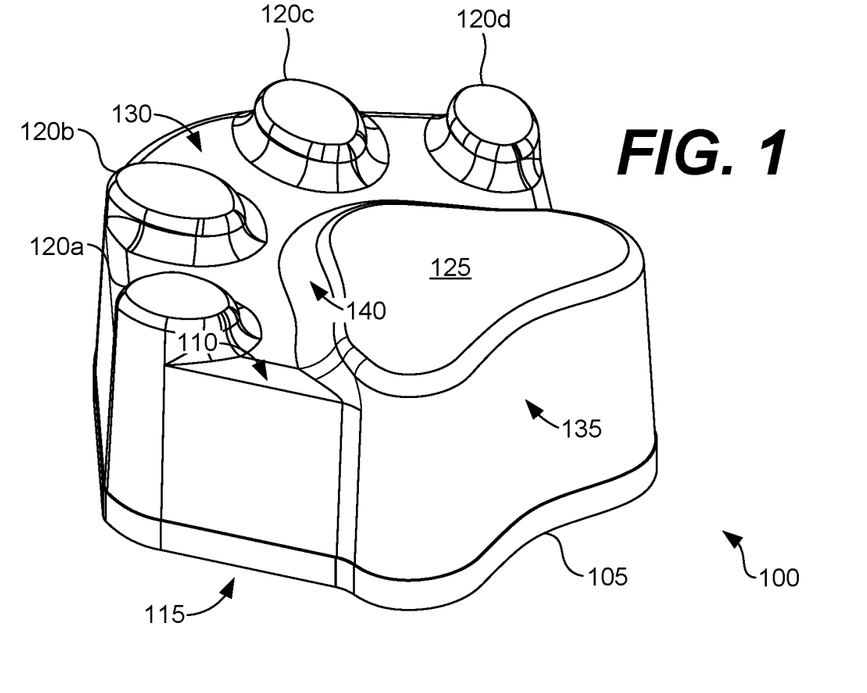
FIG. 1 is a top perspective view of a paw-shaped odor control item in accordance with various embodiments of the present disclosure.
Figure 2:
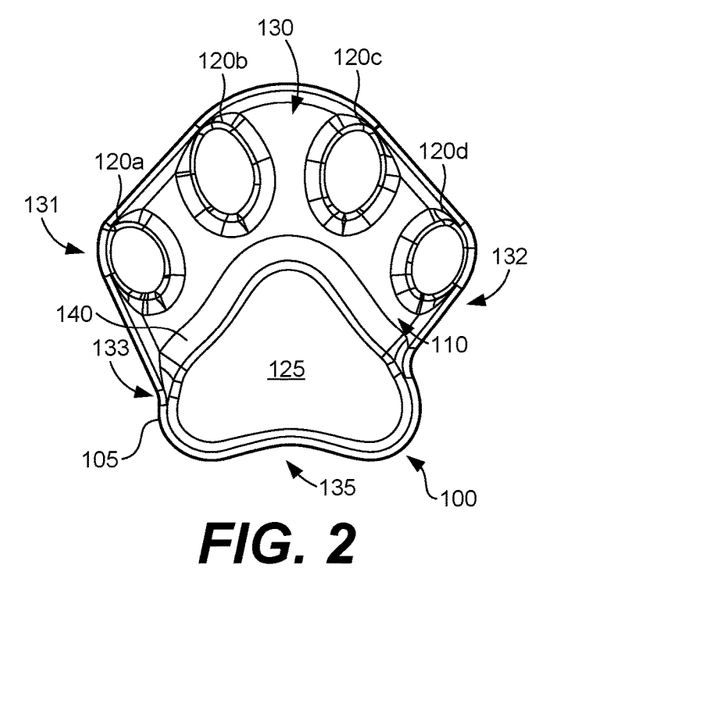
FIG. 2 is a top view of a paw-shaped odor control item in accordance with various embodiments of the present disclosure.
Figure 3:
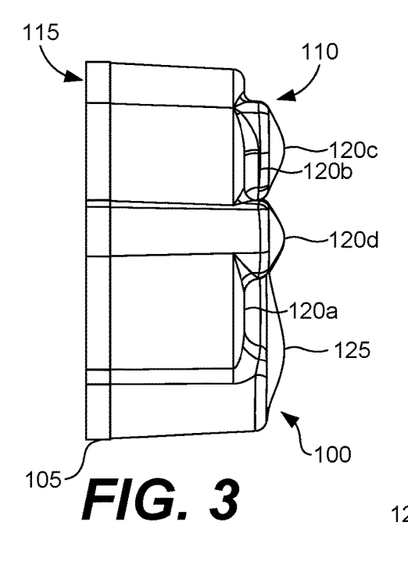
FIG. 3 is a side elevation view of a paw-shaped odor control item in accordance with various embodiments of the present disclosure.
Figure 4:
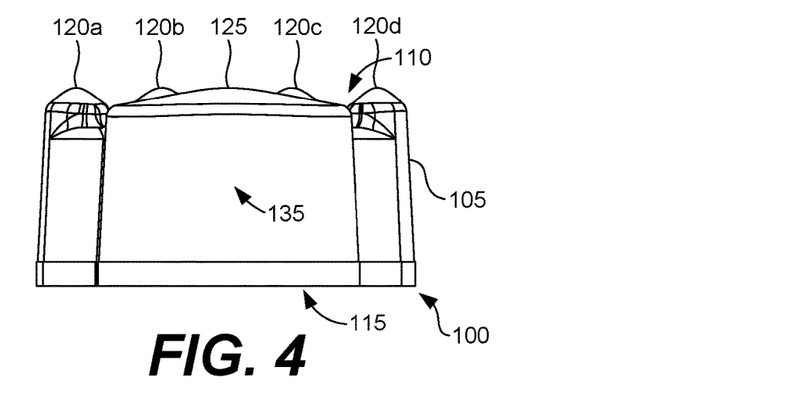
FIG. 4 is a front view of a paw-shaped odor control item in accordance with various embodiments of the present disclosure.

Referring now to FIG. 1, a top perspective view of a paw-shaped odor control item 100 is shown in accordance with various embodiments of the present disclosure. FIG. 2 is a top view of the paw-shaped odor control item 100, FIG. 3 is a side elevation view of the paw-shaped odor control item 100, and FIG. 4 is a front view of the paw-shaped odor control item 100 in accordance with various embodiments of the present disclosure.

Referring collectively to FIGS. 1-4, the paw-shaped odor control item 100 generally includes a body 105 having a top surface 110 and a bottom surface 115. Further, the paw-shaped odor control item 100 includes digital pad projections 120a . . . 120d (collectively "digital pad projections 120") and a metacarpal pad projection 125. In the embodiment of FIGS. 1-4, there are four digital pad projections 120; however, in alternative embodiments, there may be another desirable amount of digital pad projections 120. The digital pad projections 120 may be positioned at a distal top end of the body 105 of the paw-shaped odor control item 100, whereas the metacarpal pad projection 125 is positioned at a distal bottom end of the body 105.

As may be appreciated, by virtue of the shape of the body 105, which includes the digital pad projections 120 and the metacarpal pad projection 125, the paw-shaped odor control item 100 may be referred to as "paw-shaped" as it resembles a paw of a cat or other feline animal. However, the precise paw shape need not be as depicted in the Figures herein, as it is purely aesthetic. As noted above, when placed in a litter box or other desired area, the paw-shaped odor control item may act as a deodorizer and emit pleasant odors in place of or to mask unpleasant and non-desirable odors.

The digital pad projections 120 and the metacarpal pad projection 125 are raised and project from the top surface 110 of the body 105 of the paw-shaped odor control item 100. In alternative embodiments, the digital pad projections 120 and the metacarpal pad projection 125 may instead be recessed in the top surface 110 of the body 105 of the paw-shaped odor control item 100, thereby resembling a cat print. In some embodiments, the digital pad projections 120 and the metacarpal pad projection 125 are spaced apart, meaning that the digital pad projections 120 and the metacarpal pad projection 125 do not touch one another, as shown in FIG. 1. Rather, the metacarpal pad projections 125 rest on and project form a top arched portion 130, as will be described. In alternative embodiments, however, two or more of the digital pad projections 120 and the metacarpal pad projection 125 may touch one another.

The body 105 includes the top arched portion 130 extending upwards from a central region of the body 105 with a rounded, annular shape. Referring to FIG. 2, a first side 131 of the body 105 extends radially in a first direction and a second side 132 of the body 105 extends radially in a second, opposite direction, where the first side 131 and the second side 132 of the body 105 are connected by the top arched portion 130, such that a bottom end of the body 105 has a width less than a top end of the body 105 (and thereby defining the top arched portion 130). Further, the bottom end of the body 105 includes an inward arched portion 135 that forms a portion of the metacarpal pad projection 125. In some embodiments, the first side 131 of the body 105 includes a recessed arched portion 133 whereas the second side 132 of the body 105 includes a recessed arched portion 134.

Each of the projections, such as the digital pad projections 120 and the metacarpal pad projection 125, may include arched stepped regions 140 that extend from the top surface 110 of the body 105 to a respective one of the projections. The bottom surface 115 of the body 105 may be substantially flat, or having a uniform plane, as shown in FIGS. 3 and 4. Alternatively, the bottom surface 115 may be contoured or curved.

In some embodiments, the paw-shaped odor control item 100 is formed through a hot mold process where a liquid substance is poured into a mold, such as a plastic mold, and then cured to become solid. In some embodiments, the paw-shaped odor control item 100 is formed through a hot mold process where a liquid substance is poured into a paw-shaped cavity of a mold or directly in a paw-shaped cavity of a packaging tray, as will be described in greater detail below. When cured, the paw-shaped odor control item 100 may weigh between five and ten ounces in various embodiments. For instance, in some embodiments, the paw-shaped odor control item 100 may weigh approximately six ounces (e.g., ±two ounces). It is understood that the paw-shaped odor control item 100 may have another suitable weight. For instance, the paw-shaped odor control item 100 may have a greater weight for devices that act as a deodorizer for a longer period of time, or may less weight for devices that act as a deodorizer for a shorter period of time.

The liquid substance may include a fragrance, such that, when cured and placed in a litter box, the paw-shaped odor control item 100 controls odors in and around the litter box for days (e.g., seven or another suitable number of days). Additionally, the paw-shaped odor control item 100 may be formed of pet-friendly materials that are not harmful to a pet, thereby forming a pet odor eliminating product that is safe and natural, yet an effective alternative to using harsh chemicals around pets and family members. In some embodiments, the cured paw-shaped odor control item 100 is formed of and comprises water, sodium stearate, glyceryl stearate, propylene glycol, fragrance, propanediol, polysorbate 20, silica, decyl glucoside, and sodium chloride. In addition to or in place of some of the foregoing, in some embodiments, the cured paw-shaped odor control item 100 is formed of and comprises glycerin, sodium chloride, and sodium bicarbonate. As may be appreciated, reasonable substitutes to the foregoing may be employed.

Figure 5:
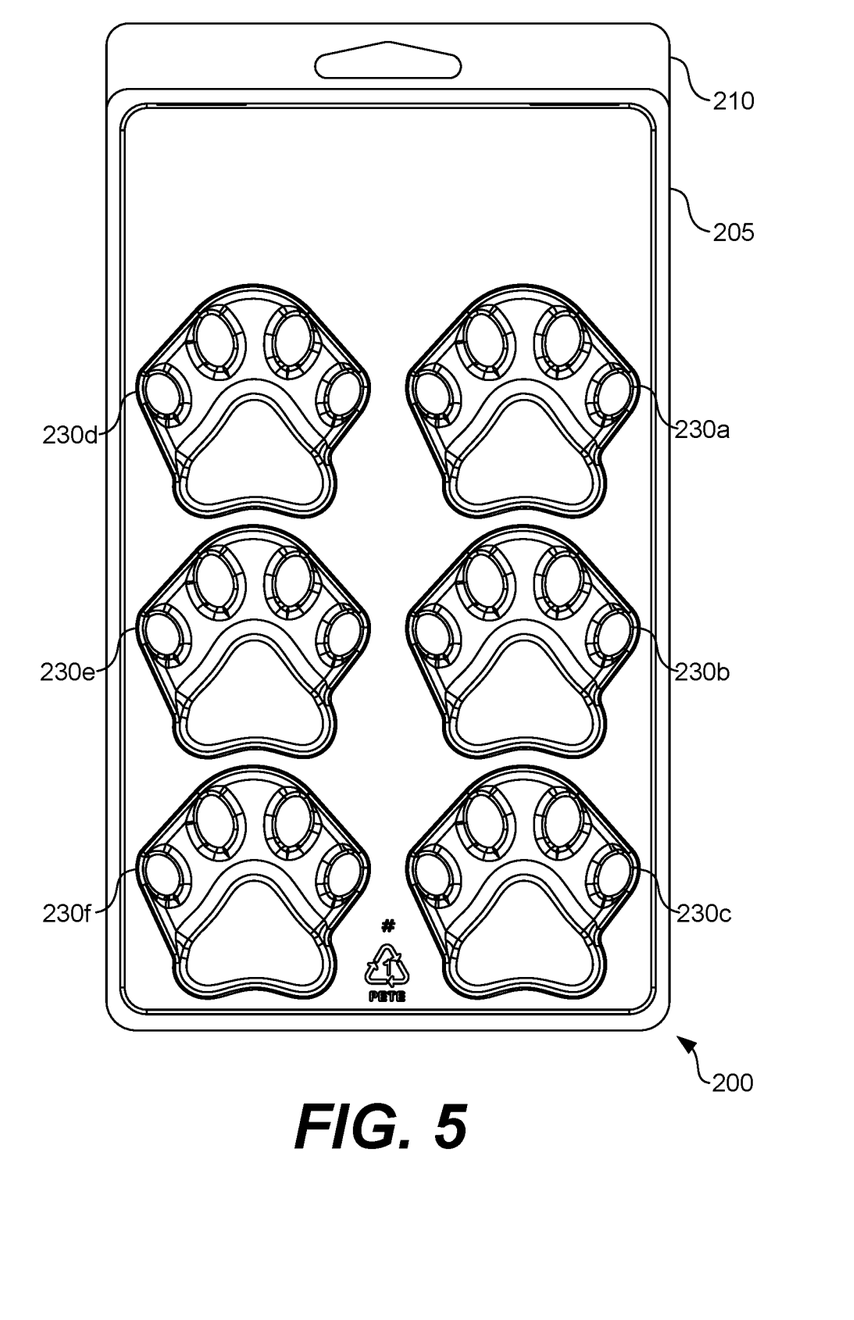
FIG. 5 is a front view of a resealable package for containing one or more paw-shaped odor control items in accordance with various embodiments of the present disclosure.
Figure 6:
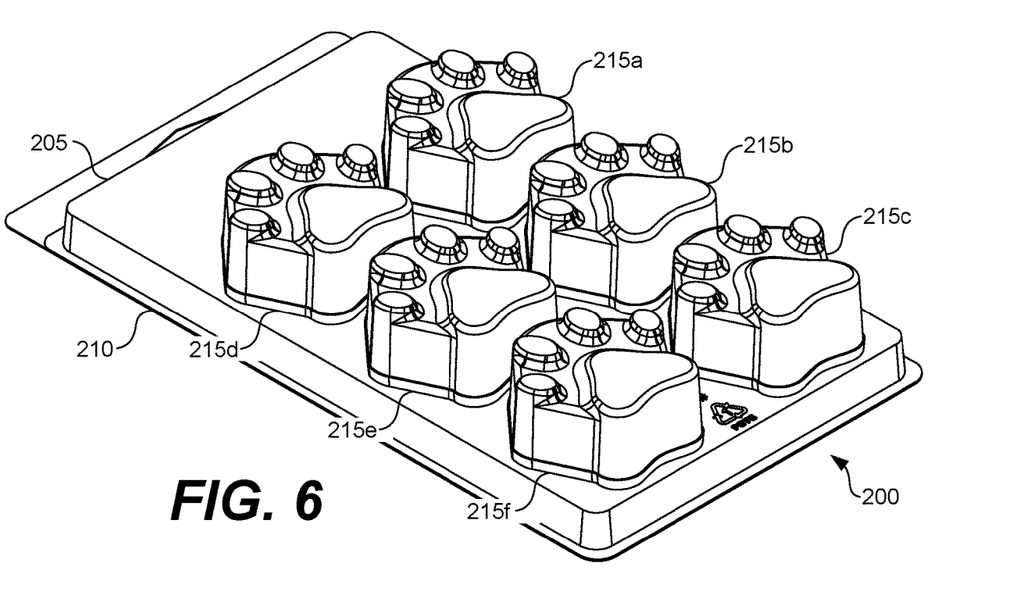
FIG. 6 is a top perspective view of a resealable package for containing one or more paw-shaped odor control items in accordance with various embodiments of the present disclosure.
Figure 7:
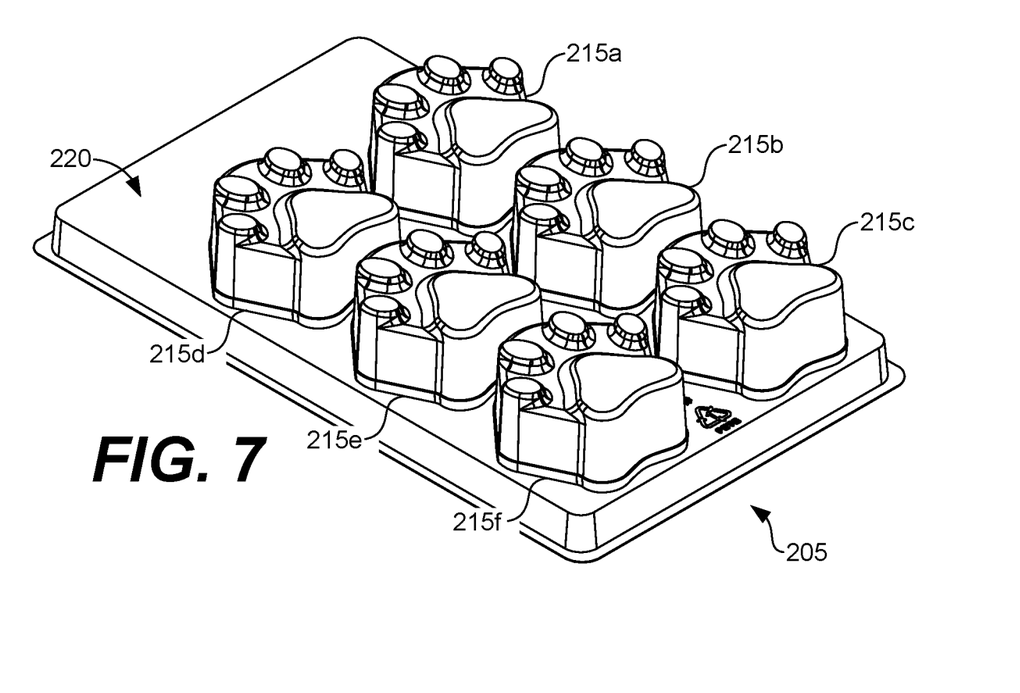
FIG. 7 is a top perspective view of a first blister of a resealable package for containing one or more paw-shaped odor control items in accordance with various embodiments of the present disclosure.

FIG. 5 is a front view and FIG. 6 is a top perspective view of a resealable package 200 for containing one or more of the paw-shaped odor control items 100 in accordance with various embodiments of the present disclosure. The resealable package 200 may include a first blister 205 and a second blister 210, which are shown separated from one another in FIGS. 7 and 8, respectively. Specifically, FIG. 7 is a top perspective view of the first blister 205 of the resealable package 200 for containing one or more of the paw-shaped odor control items 100, and FIG. 8 is a top perspective view of the second blister 210 in accordance with various embodiments of the present disclosure.

The first blister 205 may include a front blister, for example, whereas the second blister 210 may include a back blister in some examples. In some embodiments, the first blister 205 pivots relative to the second blister 210 such that the resealable package 200 is a resealable clamshell package. The precise shape of the clamshell package is aesthetic and may be rendered in other shapes than those depicted and described herein. As such the shape of the clamshell is not functional. For instance, a bottom end of the first blister 205 may be fixedly attached to a bottom end of the second blister 210, and the top end of the first blister 205 may be removably attached to a top end of the second blister 210, such that the first blister 205 and the second blister 210 pivot relative to each other, resembling a clamshell.

The resealable package 200 or, more specifically, the first blister 205 thereof may include paw-shaped cavities 215a . . . 215f (collectively "paw-shaped cavities 215") having a shape corresponding to and substantially similar to the paw-shaped odor control item 100 described herein, such that paw-shaped cavities 215 retain and store a corresponding one of the paw-shaped odor control items 100 therein. For brevity purposes, the shape of the paw-shaped cavities 215 will not be repeated herein, but are known to include the components of the paw-shaped odor control item 100 described herein. As with the paw-shaped odor control item 100, the precise shape of the paw-shaped cavities 215 is aesthetic and may be rendered in other shapes than those depicted and described herein. As such the shape of the paw-shaped cavities 215 are not functional. While the embodiments shown in FIGS. 5-8 include six of the paw-shaped cavities 215, it is understood that the resealable package 200 may include one or more paw-shaped cavities 215 retaining one or more paw-shaped odor control items 100 therein. As shown in FIG. 7, the paw-shaped cavities 215 are positioned on and projecting from a projecting first blister surface 220.

Figure 8:
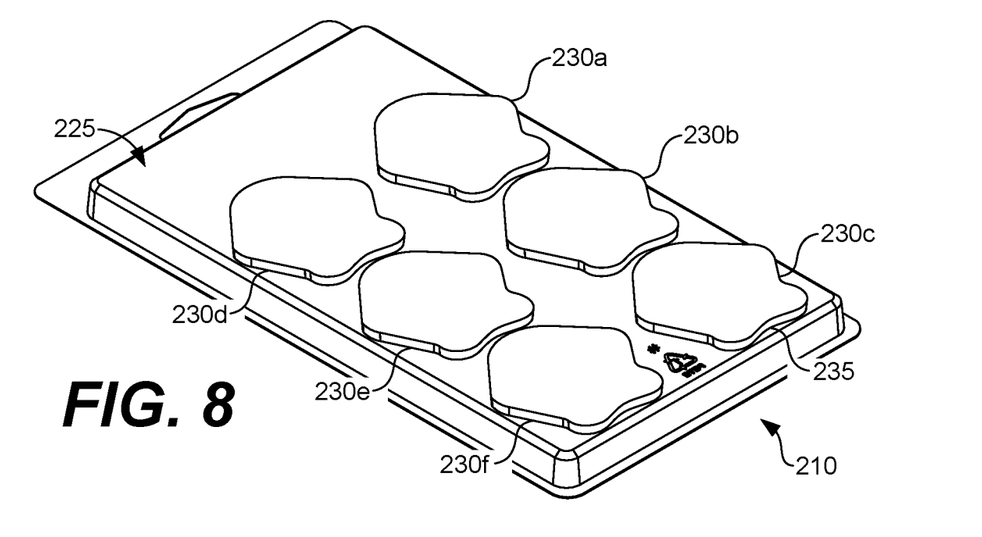
FIG. 8 is a top perspective view of a second blister of a resealable package for containing one or more paw-shaped odor control items in accordance with various embodiments of the present disclosure.

Referring specifically to FIG. 8, the second blister 210 (e.g., the back blister) may include one or more low-raised bosses 230a . . . 230f (collectively "low-raised bosses 230") that match an opening of a corresponding one of the paw-shaped cavities 215. The low-raised bosses 230 may press against a bottom surface 115 of the paw-shaped odor control item 100 to prevent excessive shaking when positioned in one of the paw-shaped cavities 215. As shown in FIG. 8, the low-raised bosses 230 are positioned on and projecting from a projecting second blister surface 225.

In some embodiments, the low-raised bosses 230 having side-walls 235 that form an interference fit and/or a snap connection with an opening of the paw-shaped cavities 215. As such, side-walls 235 of a low-raised boss 230 and the paw-shaped cavities 215 combine to form a resealable seal that prevents the paw-shaped odor control items 100 from escaping during curing and protects a scent of the plurality of paw-shaped odor control items 100 from evaporation until removed from the resealable package 200 (e.g., a clamshell package).

Figure 9:
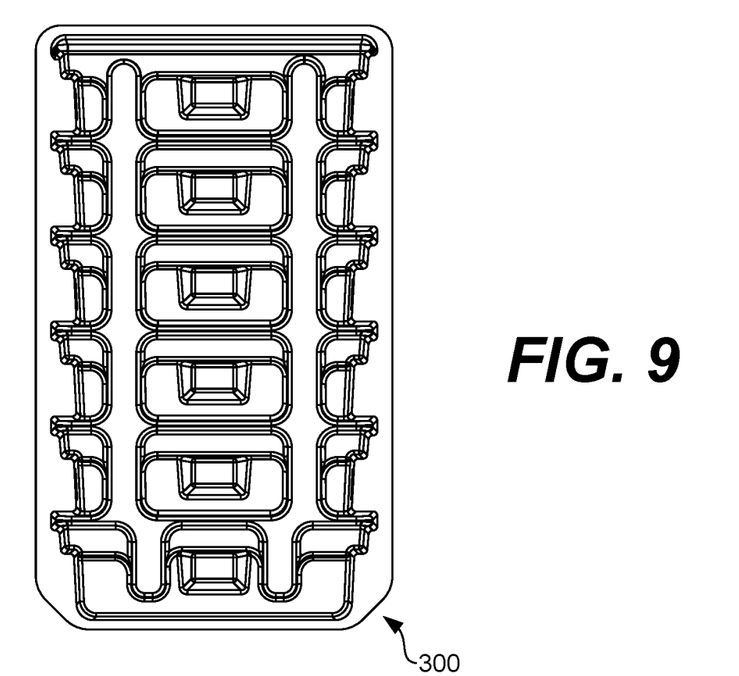
FIG. 9 is a top view of a lid for retaining a plurality of resealable packages that contain one or more paw-shaped odor control items in accordance with various embodiments of the present disclosure.
Figure 10:
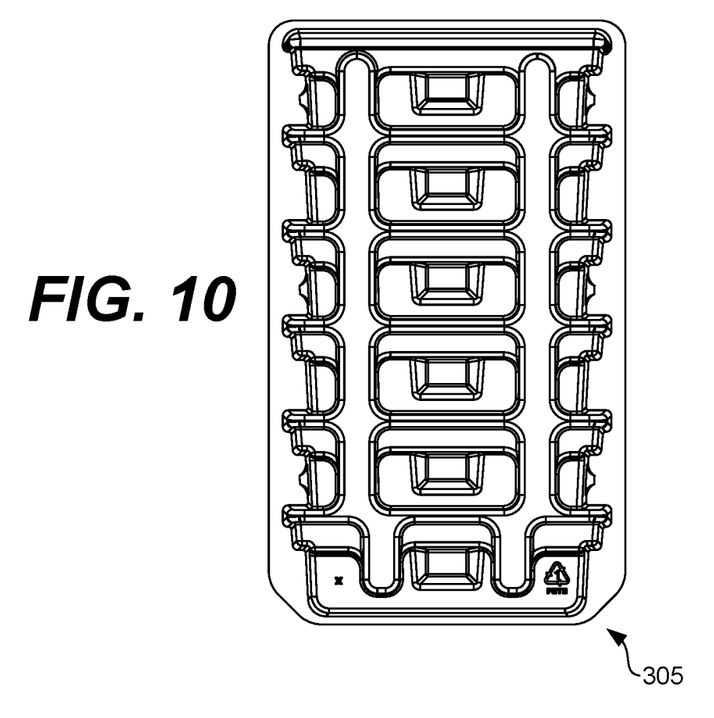
FIG. 10 is a top view of a bottom tray for retaining a plurality of resealable packages that contain one or more paw-shaped odor control items in accordance with various embodiments of the present disclosure.
Figure 11:
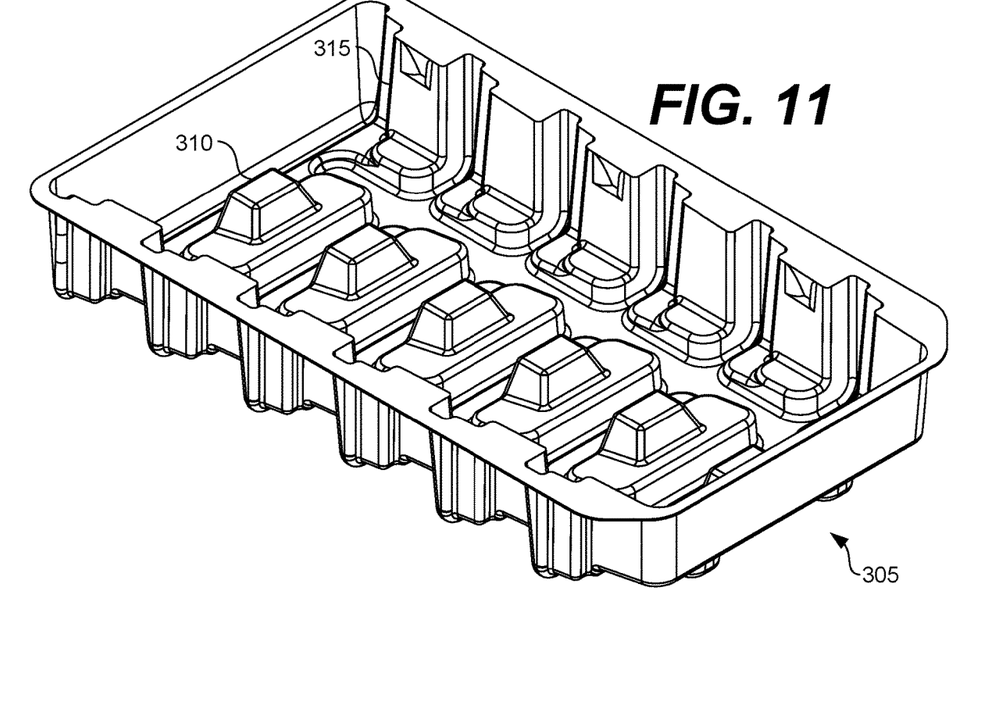
FIG. 11 is a top perspective view of a tray for retaining a plurality of resealable packages that contain one or more paw-shaped odor control items in accordance with various embodiments of the present disclosure.
Figure 12:
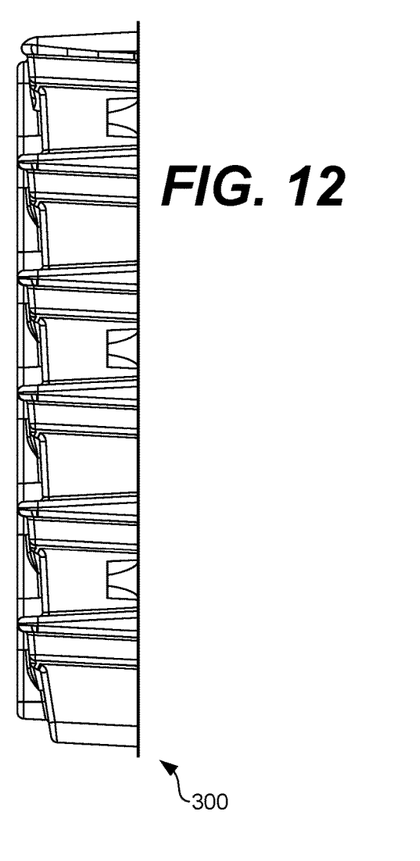
FIG. 12 is a side view of a top tray for retaining a plurality of resealable packages that contain one or more paw-shaped odor control items in accordance with various embodiments of the present disclosure.
Figure 13:
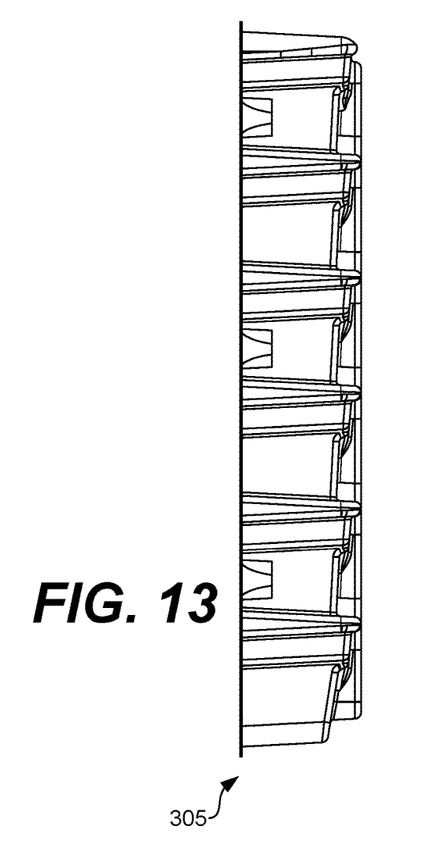
FIG. 13 is a side view of a bottom tray for retaining a plurality of resealable packages that contain one or more paw-shaped odor control items in accordance with various embodiments of the present disclosure.

FIG. 9 is a top view of a lid 300 and FIG. 10 is a bottom view of a tray 305 for retaining a plurality of resealable packages 200 that contain one or more paw-shaped odor control items 100 in accordance with various embodiments of the present disclosure. Further, FIG. 11 is a top perspective view of the tray 305. FIG. 12 is a side view of the lid 300 and FIG. 13 is a side view of the tray 305 for retaining a plurality of resealable packages 200 that contain one or more paw-shaped odor control items 100 in accordance with various embodiments of the present disclosure.

Referring collectively to FIGS. 9-13, multiple ones of the resealable packages 200 may be positioned such that the bottom end of the resealable packages 200 are retained in the tray 305. In some embodiments, while the bottom end of the resealable packages 200 are retained in the tray 305, the lid 300 may be placed on top ends of the resealable packages 200 to further retain the resealable packages 200, e.g., during transit.

Referring specifically to FIG. 11, the tray 305 may include a plurality of central projections 310 projecting from an interior, bottom surface of the tray 305. The central projections 310 position individual ones of the resealable packages 200 such that they are upright at a predetermined angle (e.g., sixty to ninety degrees) relative to a plane of a surface on which the tray 305 rests. The tray 305 further includes side projections 315 on each side of the tray 305, where sides of the resealable packages 200 are retained between adjacent side projections 315. The tray 305 of FIG. 11 is configured to retain five of the resealable packages 200 although, in other embodiments, the tray 305 may retain one or more resealable packages 200.

Accordingly, the foregoing may be combined in a system or an arrangement. For instance, an arrangement may include the paw-shaped odor control item 100, where the paw-shaped odor control item includes digital pad projections 120 and a metacarpal pad projection 125. The arrangement may further include a resealable package 200. In some embodiments, the paw-shaped odor control item 100 is one of a plurality of paw-shaped odor control items 100 positioned in the resealable package 200. As such, the resealable package 200 may include paw-shaped cavities 215 having a shape corresponding to a respective one of the plurality of paw-shaped odor control items 100, such that the paw-shaped cavities 215 are configured to retain the paw-shaped odor control items 100 stored therein.

The paw-shaped odor control items 100 may be positioned in the resealable package through a hot mold process where a liquid substance is poured into the individual ones of the paw-shaped cavities 215 and cured to form solid paw-shaped odor control items 100. In some embodiments, the resealable package 200 is a clamshell package comprising a first blister 205 (e.g., a front blister) and a second blister 210 (e.g., a back blister) pivotable relative to one another. The first blister 205 may include the paw-shaped cavities 215, whereas the second blister 210 may include at least one low-raised boss 230 that matches an opening of respective ones of the paw-shaped cavities 215.

Side-walls 235 of the at least one low-raised boss 230 and walls of the paw-shaped cavities 215 combine to form a resealable seal that prevents solid ones of the paw-shaped odor control items 100 from escaping during curing and protects a scent of the plurality of paw-shaped odor control items 100 from evaporation until removed from the resealable package 200.

The arrangement may further include a household enclosure, such as a litter box. The paw-shaped odor control item 100 may be positioned in the litter box, as may be appreciated. The paw-shaped odor control item 100 may include and/or be formed of water, sodium stearate, glyceryl stearate, propylene glycol, fragrance, propanediol, polysorbate 20, silica, decyl glucoside, and sodium chloride.

Further, the clamshell package may be one of a plurality of clamshell packages. The arrangement may further include a tray 305, where the bottom ends of the clamshell packages are partially nested in the tray 305. The tray 305 may include central projections 310 projecting from a center of an interior, bottom surface of the tray 305. Individual ones of the central projections 310 are configured to position corresponding ones of the resealable packages 200 such that corresponding ones of the resealable packages 200 are upright at a predetermined angle relative to a plane of a surface on which the tray 305 rests. The predetermined angle may be equal to or between sixty to ninety degrees.

The tray 305 may further include side projections 315 on each side of an interior of the tray 305, where sides of the resealable packages 200 are retained between adjacent side projections. The arrangement may further include a lid 300, where top ends of the plurality of clamshell packages are partially nested in the lid 300.

Figure 14:
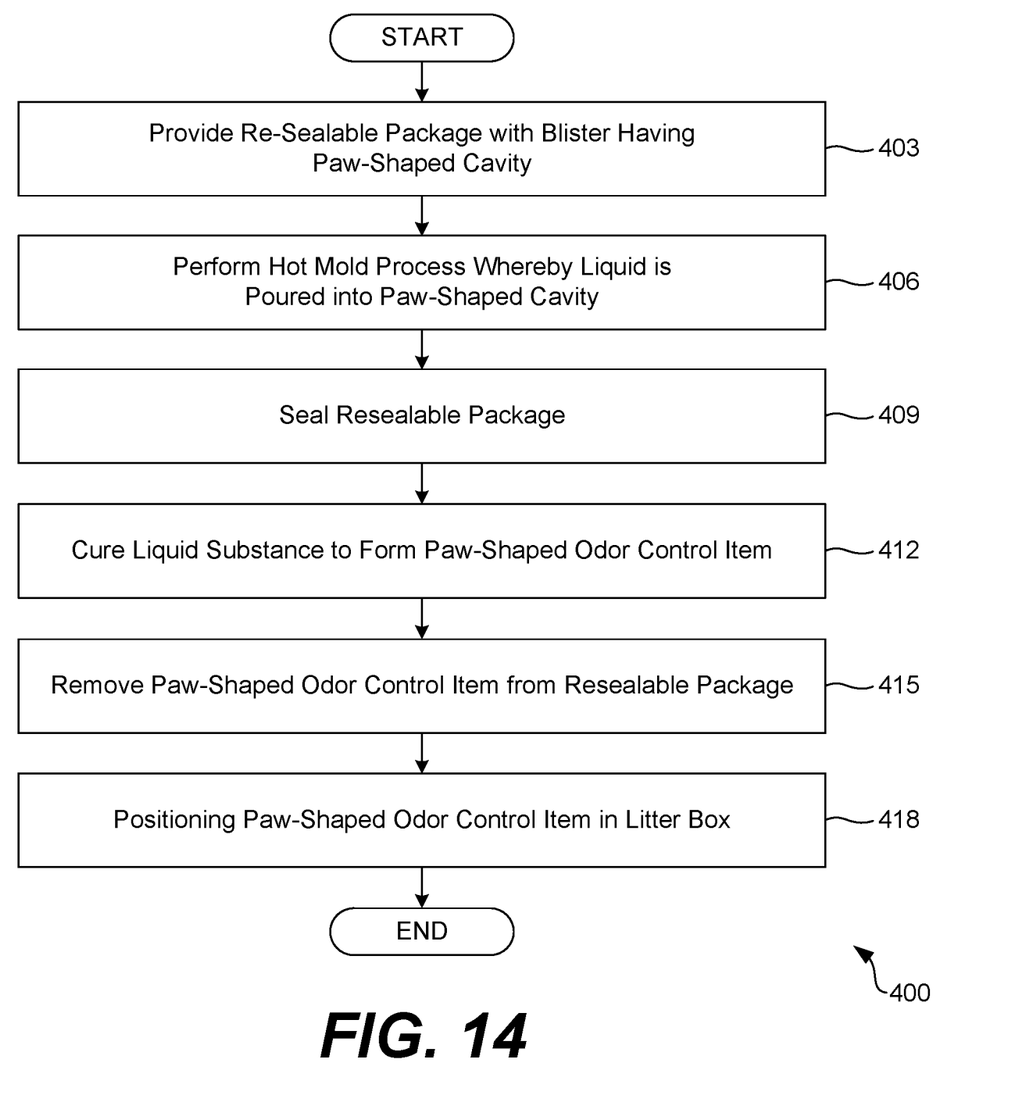
FIG. 14 is a flowchart illustrating a method for forming and using a paw-shaped odor control item in accordance with various embodiments of the present disclosure.

Referring now to FIG. 14, a flowchart 400 is shown illustrating an example method of forming a paw-shaped odor control item 100, as well as an example of its use according to various embodiments. According to various embodiments, a method of manufacture is provided. In step 403, a resealable package 200 is provided that may include a first blister 205 comprising at least one paw-shaped cavity 215.

In step 406, a hot mold process may be performed whereby a liquid substance is poured into the at least one paw-shaped cavity 215. In some embodiments, the liquid substance comprises water, sodium stearate, glyceryl stearate, propylene glycol, fragrance, propanediol, polysorbate 20, silica, decyl glucoside, sodium chloride, or a combination thereof. In addition to or in place of some of the foregoing, in some embodiments, the liquid substance may include glycerin, sodium chloride, and sodium bicarbonate. As may be appreciated, reasonable substitutes to the foregoing may be employed. This process may be performed for each of the paw-shaped cavities 215 to form a plurality of paw-shaped odor control items 100 (e.g., six ones of the paw-shaped odor control items 100, as shown in FIG. 6).

In step 409, the resealable package 200 is sealed, for instance, by coupling the first blister 205 to the second blister 210. For instance, the low-raised bosses 230 having side-walls 235 may be pressed to form an interference fit and/or a snap connection with an opening of the paw-shaped cavities 215. As such, side-walls 235 of a low-raised boss 230 and the paw-shaped cavities 215 combine to form a resealable seal that prevents the paw-shaped odor control items 100 from escaping during curing and protects a scent of the plurality of paw-shaped odor control items 100 from evaporation until removed from the resealable package 200.

Next, in step 412, the liquid substance in the paw-shaped cavities 215 is cured to form the at least one paw-shaped odor control item 100. The paw-shaped odor control item 100 as formed may include a plurality of digital pad projections 120 and a metacarpal pad projection 125, as well as other components described herein.

In step 415, a paw-shaped odor control item 100 may be removed from the resealable package 200, and the resealable package 200 may be resealed to protect other ones of the paw-shaped odor control items 100 in the tray, if applicable. In step 418, the paw-shaped odor control item 100 may be positioned in a litter box to provide odor control for the litter box. The paw-shaped odor control item 100 may be replaced with another after seven days, for example. Thereafter, the process may proceed to completion.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method for forming at least one odor control item, comprising:
    providing a resealable package comprising a first blister and a second blister, wherein the first blister comprises at least one cavity;
    performing a hot mold process whereby a liquid substance is poured into the at least one cavity; and
    curing the liquid substance while the liquid substance is in the at least one cavity to form the at least one odor control item.

2. The method according to claim 1, wherein the at least one odor control item is at least one paw-shaped odor control item comprising a plurality of digital pad projections and a metacarpal pad projection.

3. The method according to claim 2, wherein the at least one paw-shaped odor control item is one of a plurality of paw-shaped odor control items cured in the resealable package.

4. The method according to claim 3, wherein the resealable package as provided is a clamshell package.

5. The method according to claim 4, wherein:
    the at least one cavity is a plurality of paw-shaped cavities; and
    a back blister of the clamshell package comprises a plurality of low-raised bosses that match an opening of respective ones of the plurality of paw-shaped cavities.

6. The method according to claim 5, wherein:
    a plurality of side-walls of respective ones of the plurality of low-raised bosses and the plurality of paw-shaped cavities combine to form a resealable seal that prevents the plurality of paw-shaped odor control items from escaping during curing and protects a scent of the plurality of paw-shaped odor control items from evaporation until removed from the clamshell package.

7. The method according to claim 1, wherein the at least one odor control item is a litter box odor control item.

8. The method according to claim 7, wherein the method further comprises positioning the at least one paw-shaped odor control item in a litter box.

9. The method according to claim 1, wherein:
    the resealable package is a clamshell package comprising a front blister and a back blister pivotable relative to one another;
    the front blister comprises the plurality of cavities;
    the back blister comprises at least one low-raised boss that matches an opening of respective ones of the plurality of cavities; and
    a plurality of side-walls of the at least one low-raised boss and the plurality of cavities combine to form a resealable seal that prevents the solid ones of the plurality of odor control items from escaping during curing and protects a scent of the plurality of odor control items from evaporation until removed from the clamshell package.

10. The method according to claim 1, wherein the liquid substance comprises water, sodium stearate, glyceryl stearate, propylene glycol, fragrance, propanediol, polysorbate 20, silica, decyl glucoside, and sodium chloride.

11. The method according to claim 1, further comprising making the liquid substance as a combination of water, sodium stearate, glyceryl stearate, propylene glycol, fragrance, propanediol, polysorbate 20, silica, decyl glucoside, and sodium chloride.

12. The method according to claim 1, wherein:
    the clamshell package is one of a plurality of clamshell packages; and
    the method further comprises providing a tray and positioning bottom ends of the plurality of clamshell packages in the bottom of the tray such that the plurality of clamshell packages are partially nested in the tray.

13. The method according to claim 12, wherein the tray comprises a plurality of central projections projecting from a center of an interior, bottom surface of the tray.

14. The method according to claim 13, wherein:
    individual ones of the plurality of central projections are configured to position corresponding ones of a plurality of resealable packages such that the corresponding ones of the plurality of resealable packages are upright at a predetermined angle relative to a plane of a surface on which the tray rests; and
    the predetermined angle is equal to or between sixty to ninety degrees.

15. The method according to claim 13, wherein the tray further comprises side projections on each side of an interior of the tray, where sides of the plurality of resealable packages are retained between adjacent side projections.

16. The method according to claim 12, further comprising providing a lid and positioning top ends of the plurality of clamshell packages in the lid such that the plurality of clamshell packages are partially nested in the lid.

* * * * *